US011310137B2

(12) United States Patent
Bandopadhyay et al.

(10) Patent No.: US 11,310,137 B2
(45) Date of Patent: Apr. 19, 2022

(54) SYSTEM AND METHOD TO PROPAGATE INFORMATION ACROSS A CONNECTED SET OF ENTITIES IRRESPECTIVE OF THE SPECIFIC ENTITY TYPE

(71) Applicant: Veritas Technologies LLC, Santa Clara, CA (US)

(72) Inventors: Tushar Bandopadhyay, Saratoga, CA (US); Bharat Dighe, Cupertino, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 177 days.

(21) Appl. No.: 15/857,577

(22) Filed: Dec. 28, 2017

(65) Prior Publication Data

US 2018/0227205 A1    Aug. 9, 2018

Related U.S. Application Data

(60) Provisional application No. 62/599,783, filed on Dec. 17, 2017, provisional application No. 62/454,871, filed on Feb. 5, 2017.

(51) Int. Cl.
*G06F 15/173* (2006.01)
*H04L 43/0817* (2022.01)
(Continued)

(52) U.S. Cl.
CPC ...... *H04L 43/0817* (2013.01); *G06F 11/3051* (2013.01); *G06F 11/3072* (2013.01);
(Continued)

(58) Field of Classification Search
CPC .............. H04L 43/0817; H04L 41/082; H04L 61/2076
See application file for complete search history.

(56) References Cited

U.S. PATENT DOCUMENTS

| 5,649,152 A | 7/1997 | Ohran et al. | G06F 12/00 |
| 5,835,953 A | 11/1998 | Ohran | G06F 12/16 |

(Continued)

FOREIGN PATENT DOCUMENTS

| CN | 109154905 | 3/2020 |
| JP | 2020047107 | 3/2020 |
| WO | WO 2017/014814 A1 | 1/2017 |

OTHER PUBLICATIONS

Alferes, Jose Julio et al., "Evolution and Reactivity in the Semantic Web," F. Bry and J. Maluszynski (eds.): Semantic Techniques for the Web; Lecture Notes in Computer Science-5500; Sep. 29, 2009; pp. 161-200.

(Continued)

*Primary Examiner* — Hua Fan

(57) ABSTRACT

Various systems and methods are provided for propagating information throughout a data center or other network environment. For instance, in certain embodiments, the functionality disclosed herein includes determines propagation rules, and then either stores and/or propagates those rules throughout the datacenter or other network environment. Propagation rules define various conditions or other variables that govern propagation of information throughout a system, such as those systems described herein. The propagation rules can then be used to perform various other functionality. For instance, the functionality described herein can be used to process updates to entities. The functionality described herein can also be used to process updates to propagation metadata. Additionally, the functionality described herein can be used to process the creation of new relationships. The functionality described herein can also be used to process the deletion of objects and/or relationships. All of the foregoing functionality can be performed automatically.

20 Claims, 9 Drawing Sheets

(51) Int. Cl.
*H04L 61/5076* (2022.01)
*G06F 16/23* (2019.01)
*G06F 11/30* (2006.01)
*H04L 41/0816* (2022.01)
*G06F 16/901* (2019.01)
*G06F 16/27* (2019.01)
*H04L 41/082* (2022.01)

(52) U.S. Cl.
CPC .......... *G06F 16/23* (2019.01); *G06F 16/2358* (2019.01); *G06F 16/27* (2019.01); *G06F 16/9024* (2019.01); *H04L 41/082* (2013.01); *H04L 41/0816* (2013.01); *H04L 61/2076* (2013.01); *G06F 11/3006* (2013.01); *G06F 11/3048* (2013.01); *G06F 2201/86* (2013.01)

(56) References Cited

U.S. PATENT DOCUMENTS

| | | | |
|---|---|---|---|
| 5,875,479 A | 2/1999 | Blount et al. | G06F 12/16 |
| 5,915,098 A | 6/1999 | Palmer et al. | G06F 13/00 |
| 6,073,222 A | 6/2000 | Ohran | G06F 12/00 |
| 6,085,298 A | 7/2000 | Ohran | G06F 12/16 |
| RE37,601 E | 3/2002 | Eastridge et al. | G06F 11/00 |
| 6,728,898 B2 | 4/2004 | Tremblay et al. | G06F 11/00 |
| 6,732,245 B2 | 5/2004 | Kaiya et al. | G06F 12/00 |
| 6,779,093 B1 | 8/2004 | Gupta | G06F 12/06 |
| 7,103,796 B1 | 9/2006 | Kekre et al. | G06F 11/00 |
| 7,386,752 B1 | 6/2008 | Rakic et al. | |
| 7,987,368 B2 * | 7/2011 | Zhu | H04L 63/0407 713/156 |
| 8,577,850 B1 | 11/2013 | Genda | G06F 17/30 |
| 8,874,508 B1 | 10/2014 | Mittal | G06F 17/00 |
| 9,087,088 B1 | 7/2015 | Bose | |
| 9,442,806 B1 | 9/2016 | Bardale | G06F 11/1453 |
| 9,509,697 B1 | 11/2016 | Salehpour | |
| 9,575,789 B1 * | 2/2017 | Rangari | G06F 9/45533 |
| 9,740,422 B1 | 8/2017 | Ozdemir | G06F 3/0614 |
| 10,496,494 B1 | 12/2019 | Haloi | G06F 16/00 |
| 10,592,149 B1 | 3/2020 | Jenkins | G06F 3/06 |
| 2003/0014433 A1 | 1/2003 | Teloh et al. | G06F 12/00 |
| 2003/0061366 A1 | 3/2003 | Musante et al. | G06F 15/16 |
| 2003/0126388 A1 | 7/2003 | Yamagami | G06F 13/00 |
| 2003/0158869 A1 | 8/2003 | Micka | G06F 12/00 |
| 2004/0049365 A1 | 3/2004 | Keller et al. | |
| 2007/0185937 A1 | 8/2007 | Prahlad | G06F 17/30 |
| 2008/0279204 A1 | 11/2008 | Pratt, Jr. | H04L 12/56 |
| 2009/0187923 A1 | 7/2009 | McKinney | 719/318 |
| 2010/0070447 A1 | 3/2010 | Pfunter et al. | 706/47 |
| 2010/0169720 A1 | 7/2010 | Lumpp et al. | |
| 2011/0126099 A1 | 5/2011 | Anderson et al. | |
| 2013/0054523 A1 | 2/2013 | Anglin | G06F 17/30 |
| 2015/0278395 A1 * | 10/2015 | Ben Jemaa | G06F 16/9024 707/756 |
| 2015/0280999 A1 | 10/2015 | Chart et al. | 709/224 |
| 2016/0306560 A1 | 10/2016 | Maranna | G06F 11/1435 |
| 2016/0371007 A1 | 12/2016 | Shani | G06F 3/06 |
| 2017/0286690 A1 | 10/2017 | Chari | |
| 2017/0289187 A1 | 10/2017 | Noel | |
| 2017/0300244 A1 | 10/2017 | Crawford et al. | G06F 3/0619 |
| 2018/0109425 A1 | 4/2018 | Chart et al. | |
| 2018/0285201 A1 | 10/2018 | Bangalore et al. | G06F 11/14 |
| 2018/0295029 A1 * | 10/2018 | Shivanna | H04L 67/10 |
| 2019/0138995 A1 | 5/2019 | Currin | G06Q 10/10 |
| 2020/0097198 A1 | 3/2020 | Bansal | G06F 3/06 |

OTHER PUBLICATIONS

Bandopadhyay, Tushar et al.; "Method and System for Dependency Analysis of Workloads for Orchestration"; U.S. Appl. No. 15/844,359, filed Dec. 15, 2017; consisting of Specification, Claims, Abstract, and Drawings; 77 pages.

Deng, Li et al., "vMerger: Server Consolidation in Virtualized Environment," 2013 IEEE 11th Int'l Conference on Dependable, Autonomic and Secure Computing, pp. 606-612.

Patil, Rushikesh et al.; "Methods and Systems for Data Resynchronization in a Replication Environment"; U.S. Appl. No. 16/805,294, filed Feb. 28, 2020, consisting of Specification, Claims, Abstract, and Drawings. 67 pages.

Patil, Rushikesh Patil et al.; "Methods and Systems for Data Resynchronization in a Replication Environment"; U.S. Appl. No. 16/805,292, filed Feb. 28, 2020, consisting of Specification, Claims, Abstract, and Drawings. 49 pages.

Patil, Rushikesh et al. "Method and System for Data Consistency Across Failure and Recovery of Infrastructure"; U.S. Appl. No. 16/836,288, filed Mar. 31, 2020; consisting of Specification, Claims, Abstract, and Drawings; 29 pages.

Zhang, Shuangmin et al.; "Optimize Backup from Universal Share"; U.S. Appl. No. 16/835,657, filed Mar. 31, 2020; consisting of Specification, Claims, Abstract, and Drawings; 28 pages.

PCT International Written Opinion and Search Report of the International Searching Authority for Application No. PCT/US2021/015384 dated Apr. 13, 2021, 12 pages.

PCT International Written Opinion and Search Report of the International Searching Authority for Application No. PCT/US2021/015379 dated May 12, 2021, 12 pages.

PCT International Written Opinion and Search Report of the International Searching Authority for Application No. PCT/US2021/024850 dated Aug. 2, 2021, 14 pages.

EP Application No. 18 707 994.2-1224, EP Examination Report dated Sep. 6, 2021, 9 pages.

* cited by examiner

SYSTEM AND METHOD TO PROPAGATE INFORMATION ACROSS A CONNECTED SET OF ENTITIES IRRESPECTIVE OF THE SPECIFIC ENTITY TYPE

RELATED APPLICATIONS

This application claims benefit under 35 U.S.C § 119(e) of Provisional Patent Application No. 62/599,783, filed on Dec. 17, 2017, entitled "System and Method to Propagate Information Across a Connected Set of Entities Irrespective of the Specific Entity Type," and having Tushar Bandopadhyay and Bharat Dighe as inventors. This application also claims benefit under 35 U.S.C § 119(e) of Provisional Patent Application No. 62/454,871, filed on Feb. 5, 2017, entitled "Resilient Information Technology Platform Management Across Heterogeneous Systems," and having Tushar Bandopadhyay, Naresh Moorthy, Bharat Dighe, Meenal Binwade, Swanand Vaidya, Shrikant Ghare, Ankit Jain, Anish Vaidya, Rohan Kumar Kayan, Kushal Shah, Devdas Kumkar, Soumya Sakha Tripathy, Sunil Hasbe, Aditya Deshpande, Dhiraj Maheshwari, Anuj Gupta, Vishwanath Kitekar, and Pooja Singh as inventors. The above-referenced applications are hereby incorporated by reference as though set forth in full herein, in their entirety and for all purposes.

BACKGROUND OF THE INVENTION

Field of Endeavor

This disclosure relates to computer technology, and more specifically to automatically propagating and/or annulling information throughout a datacenter or similar computing environment.

State of the Technology

A datacenter can include a collection of entities which include hardware devices, software components, application instances and business applications, among other potential features and functionality. Interdependencies exist among such entities. Such interdependencies can be direct interdependencies or indirect interdependencies. The relationship between such entities can be dynamic. As such, any updates, modification, additions, deletions or other changes (collectively, "changes" and cognates thereof) to these entities can affect the behavior and requirements of other entities in the datacenter, particularly, but not limited to, the entities that are directly related to the changed entities. One of the problems created by the use of such functionality is the need for a way to efficiently propagate information among such entities in a manner that is generic, and therefore independent of (but still usable by) various types of entities within a datacenter or network.

SUMMARY OF THE DISCLOSURE

The disclosure generally includes methods, computer program products, computer systems, and the like, that provide for propagating information throughout a data center or other network environment. In one embodiment, the functionality disclosed herein includes determining propagation rules, and then storing those rules and/or propagating those rules throughout the datacenter or other network environment. Propagation rules define various conditions or other variables that govern propagation of information throughout a system, such as those systems described herein.

In one embodiment, these propagation rules can include at least the following five factors: (1) Start condition; (2) Direction of Propagation; (3) Skip condition; (4) Reverse condition; and (5) End condition. In various embodiments, one or more of these factors can be excluded, and one or more additional factors can be added. Once the propagation rules have been determined, those rules can be either stored (such as, e.g., in an efficient cache such as can be found in, e.g., a management server) and/or propagated throughout a system.

Subsequent to the creation and storage of the propagation rules, those rules can be used to perform various other functionality, such as is described herein. For instance, in certain embodiments, the functionality described herein can be used to process updates to entities. In certain embodiments, the functionality described herein can be used to process updates to propagation metadata. In certain embodiments, the functionality described herein can be used to process the creation of new relationships. In certain embodiments, the functionality described herein can be used to process the deletion of objects and/or relationships. All of the functionality described herein can be performed automatically, such as, e.g., upon detecting additions or changes to a datacenter or other system or network. The foregoing functionality is discussed in more detail below.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

Figure 1A:
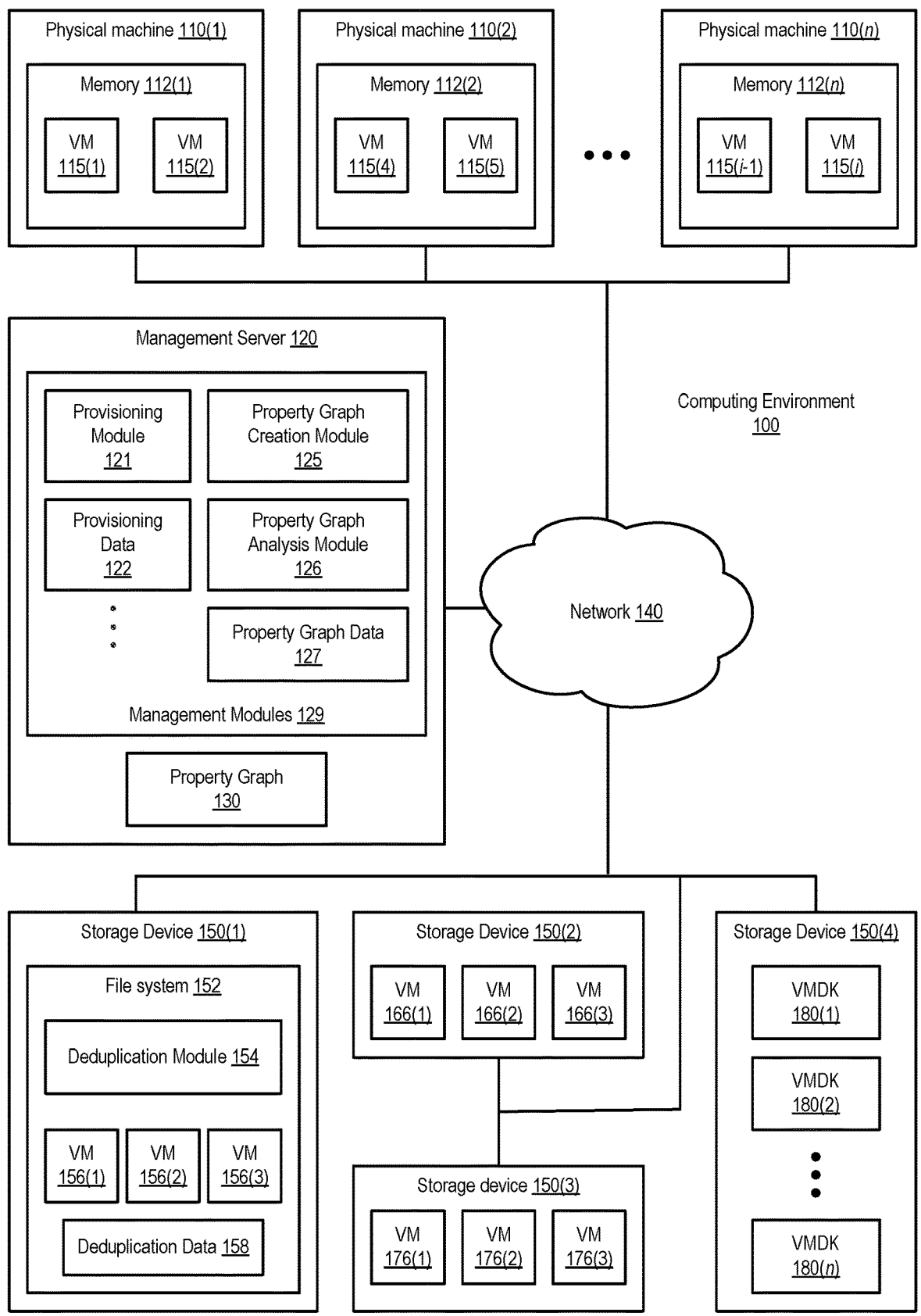
FIG. 1A is a block diagram illustrating an example of a computing environment that includes management functionality, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

As noted above, in part, a datacenter can be viewed as a collection of entities which include hardware devices, software components, application instances and business applications, among other potential features and functionality. Interdependencies exist among such entities. Such interdependencies can be direct interdependencies or indirect interdependencies. These interdependencies can be visualized as a complex graph (referred to herein as a "property graph") of the entities and the relationships between them. The relationship between such entities is dynamic. As such, any updates, modification, additions, deletions or other changes (collectively, "changes" and cognates thereof) to these entities can affect the behavior and requirements of other entities in the datacenter, particularly, but not limited to, the entities that are directly related to the changed entities. One of the problems created by the use of such functionality is the need for a way to efficiently propagate information among such entities in a manner that is generic, and therefore independent of (but still by) various types of entities within a datacenter or network.

The systems and methods disclosed herein provide various benefits and improvements to datacenters and similar systems. For instance, the present disclosure allows for the dynamic modifications of entities when new entities are introduced into a system. Additionally, propagating information in the manner disclosed herein is agnostic to any changes in the path (or the devices connected thereto) between a source entity and a target entity. Further, propagation from a source entity to a target entity can be configured to occur automatically when the addition of one or more new entities results in a new path between the source and target entities. As another example, the disclosure provided herein allows for the efficient evaluation of changes to entities by automatically propagating that information to impacted entities.

The functionality described herein is accomplished, at least in part, by the use of propagation rules. Propagation rules provide information about one or more propagation paths from a source entity to a target entity, such as the paths that are shown in FIG. 1B, which will be described and discussed in more detail below. In one embodiment, the system can load a set of propagation rules that define paths between source entities and target entities. In one embodiment, such information can be stored in a lookup table. Such rules can be used by the system (or a component thereof) to evaluate updates to entities and relationships, and to check if any paths exist over which such information should be propagated. In various embodiments, where multiple paths to be evaluated exist, the system can store the various paths in a temporary queue until each path can be fully and adequately evaluated.

Figure 1B:
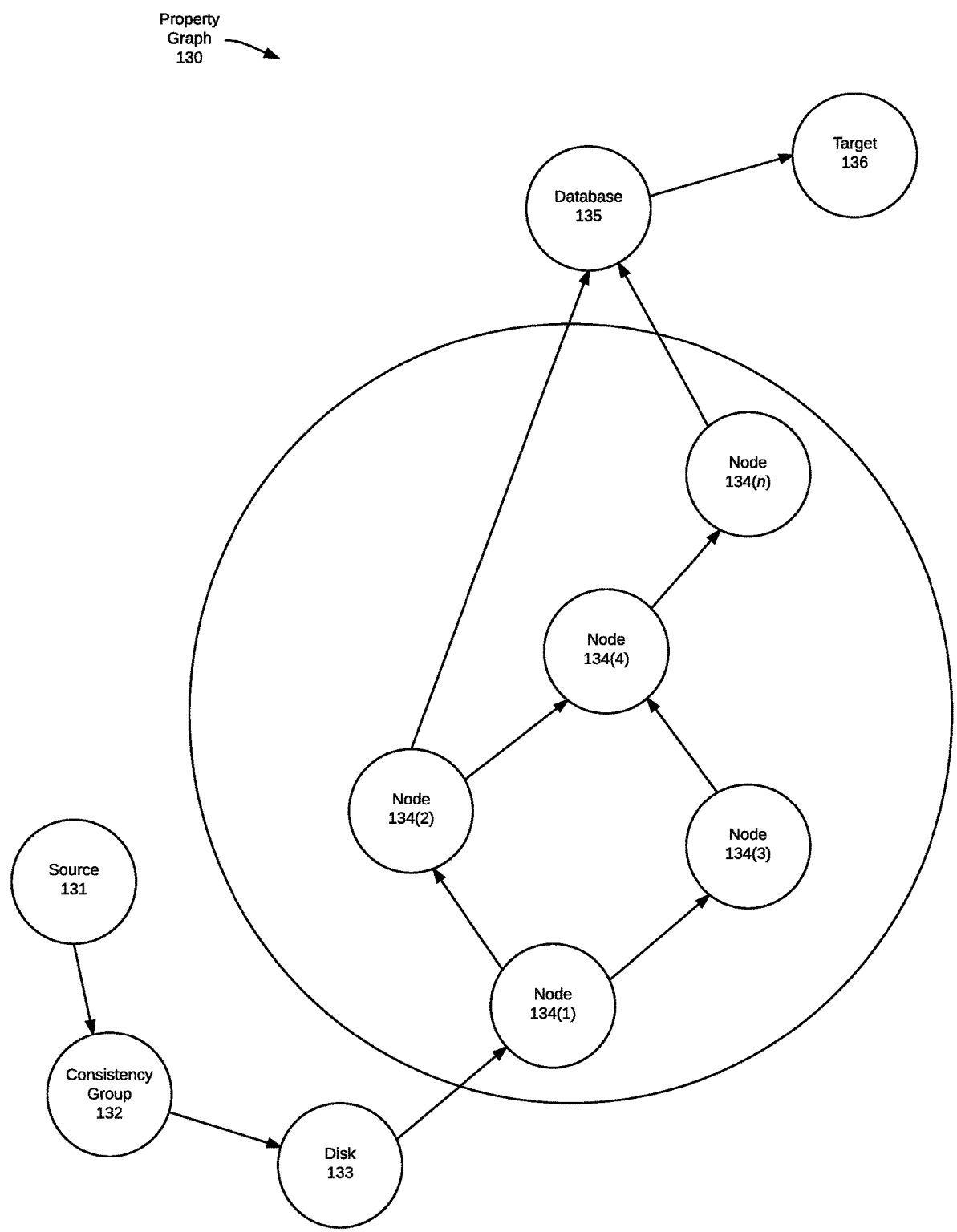
FIG. 1B is a block diagram that provides additional details of a property graph, according to one embodiment of this disclosure.

FIG. 1A is a block diagram of a computing environment 100. Although one example embodiment is provided for discussion purposes herein, alternative embodiments can implement different numbers of physical machines, different numbers of virtual machines per physical machine, and the same system can include one or more physical machines that each implement a different number of virtual machines than other physical machines within the same environment.

As shown, computing environment 100 includes several physical machines 110(1)-110(n) (computing systems). Physical machines 110 are computing devices, or portions of computing devices, an can be computing devices of any sort, such as personal computers, laptop computers, servers, personal digital assistants, cell phones, or the like. In some embodiments, such physical machines are included in a cloud computing environment in which physical computing resources, such as memory and processor cycles, are allocated on an as-needed and/or as-contracted basis. The resources of a physical machine 110 are shared by any virtual machines that are implemented on the physical machine. Physical machines 110 each include memory 112. Memory 112 is, in an embodiment, random access memory (RAM). Memory 112 is organized into a number of pages. A page is generally a fixed size portion of memory, for example a 4 kilobyte (Kb) portion of memory. Physical machines 110 are coupled to a management server 120 and a number of storage devices 150(1)-150(4) by a network 140. Network 140 can include a WAN (Wide Area Network), such as the Internet, one or more LANs (Local Area Networks), and/or one or more SANs (Storage Area Networks), among other such constructs and systems.

As used throughout this disclosure, the letters n and i are used to indicate a variable number of devices or components. Although the letters n and i are used in describing a variable number of instances of each of these different devices and components, a repeated use of the letters n and i does not necessarily indicate that each device and component has a same number of n or i instances implemented in the example system discussed herein, or in any other embodiment of this invention. Rather, these variable identifiers are used to more simply designate the final element (e.g., physical machine 110(n)) of a series of related or similar elements (e.g., physical machines). The repeated use of such variable identifiers is not meant to imply a correlation between the sizes of such series of elements, although such correlation may exist.

Each physical machine 110 hosts several virtual machines 115(1)-115(i). Virtual machines 115 can be used to provide computing resources, for example, to a user associated with an organization. When a user (e.g., an information technology (IT) professional in an organization) requests additional resources, an administrator (e.g., IT professional) at the cloud vendor can provision one or more additional virtual machines to satisfy the request for additional resources.

Management server 120 can be, for example, a computing device, or portion of a computing device, such as a personal computer, laptop computer, server, personal digital assistant, cell phone, or the like. Management server 120 can select a target physical machine to host a new or migrated virtual machine. Management server 120 includes a provisioning module 121 and provisioning data 122. Management server 120 can be used to create, update, and maintain property graphs, such as property graph 130, which will be discussed in more detail in conjunction with FIG. 1B, below. Management server 120 also contains numerous components that can be used to perform such functionality on property graph 130.

In one embodiment, a provisioning module 121 can be employed to detect requirements specified by a user in a request for computing resources. Provisioning module 121, which uses provisioning data 122 to perform its functions, can automatically create or locate a virtual machine in response to the request and cause the virtual machine to be provisioned on one of physical machines 110. As can be seen, provisioning module 121 (and its associated provisioning data 122), as well as a property graph creation module 125 and a property graph analysis module 126 (and associated property graph data 127), are among the modules supported by management server 120 (which modules are depicted, as examples, in FIG. 1A as management modules 129). The operation of systems such as property graph creation module 125 and property graph analysis module 126 are described below.

The administrator (or an automated process) can also move one or more virtual machines from a first physical machine to an alternate physical machine. For example, an administrator (or an automated process) can move (migrate) one or more virtual machines to a different (target) physical machine in response to detecting that a physical machine is failing, has failed, is overloaded, or that additional resources are available on a different physical machine from the physical machine currently hosting the one or more virtual machines. In an embodiment, provisioning module 121 can automatically detect a condition that indicates a virtual machine should be migrated, such as detecting that a physical machine is failing, has failed, is overloaded, or that additional resources are available on a different physical machine from the physical machine currently hosting the one or more virtual machines. Provisioning module 121 can automatically migrate one or more virtual machines in response to detecting such a condition, as part of providing orchestration services.

Provisioning module 121 can select a target physical machine based upon the likelihood that a new virtual machine (or a virtual machine being migrated from one physical machine to another physical machine) will more effectively utilize resources (e.g., memory) of the target physical machine (e.g., by virtue of sharing a greater number of memory pages with one or more virtual machines that are or will be hosted by the target physical machine). Further, such operations can be performed in an intuitive, efficient manner, using a graphical user interface (GUI) presented for the administration of management server 120.

Provisioning module 121 can collect and maintain information regarding provisioning using provisioning data 122, and determine the manner in which one or more virtual machines, their associated storage components (virtual machine disks (VMDKs)), associated functionality, and the like, are provisioned to make appropriate (or, at least, acceptable) use of the available resources. This can be, for example, a determination to accept a given VM (e.g., indicating which physical machine is likely to share the largest number of shared memory pages with a given virtual machine and storing the information in provisioning data 122). Provisioning module 121 can analyze provisioning data 122 to select which physical machine is to host a virtual machine. Provisioning module 121 can collect provisioning data 122 in various forms from various sources. Provisioning module 121 can also keep track of the data being maintained in each physical machine's memory. In one embodiment, each physical machine periodically transmits information regarding the pages stored in the physical machine's memory to provisioning module 121. Alternatively, the physical machine in question can transmit a list of such information in response to adding a new page to memory, in response to a new virtual machine being provisioned on the physical machine, and/or in response to a request by provisioning module 121 for a list of entries, among other possibilities. In one embodiment, each entry includes an address, e.g., an address of a page. In one embodiment, such information can include a tag that identifies a characteristic of one or more virtual machines hosted by the physical machine, such as an operating system or application used by a virtual machine hosted by the physical machine.

In an embodiment in which a virtual machine is running on a physical machine and is being migrated to another physical machine, provisioning module 121 can use resource information (e.g., memory information) from the physical machine on which the virtual machine is running, to determine to which of multiple available physical machines (target physical machines) the virtual machine should be migrated. Using the present example, provisioning module 121 can compare information regarding the virtual machine (as received from the physical machine that is hosting the virtual machine) with information for each of the target physical machines, in order to identify one more candidates to which the given virtual machine might be migrated.

When a virtual machine is not already running on a physical machine, such as when a new virtual machine is being provisioned, management server 120 can perform operations to provision the virtual machine, including determining the computing resources needed by the virtual machine being provisioned. In one embodiment, provisioning module 121 receives virtual machine information from a storage device, such as one of storage devices 150, instead of and/or in addition to receiving from the physical machines. Storage devices 150 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

A number of virtual machines (e.g., VMs 156(1)-(3), 166(1)-(3), and 176(1)(3)) can be stored on one or more of storage devices 150 (e.g., storage devices 150(1)-(3)), as can one or more VMDKs (e.g., VMDKs 180(1)-(*n*), stored on storage device 150(4)). Provisioning module 121 can obtain information regarding one or more of these virtual machines and provision the virtual machine(s) in question. Provisioning module 121 can also obtain information regarding one or more of virtual machines 115, in order to store the virtual machine(s) in question. As depicted in FIG. 1A, storage device 150(1) implements a file system 152, which includes a deduplication module 154. File system 152 supports deduplication of data stored therein, including virtual machines 156. In this example, virtual machines 156(1)-156(3) are deduplicated. That is, each virtual machine 156 is formed from a set of data. In certain embodiments, a virtual machine 156 includes data that is identical to the data of another of virtual machine 156. This situation is likely in cases where two or more virtual machines 156 include identical applications and/or operating systems. When multiple virtual machines 156 include identical data, storage device 150(1) stores only a single copy of the identical data. Deduplication data 158 thus includes information identifying which portions of data that make up virtual machines 156 is shared among the virtual machines, e.g., identical between two or more virtual machines 156. Provisioning module 121 can use deduplication data 158 to select a physical machine to host one of virtual machines 156.

Such storage devices can also include one or more fingerprint modules that can calculate fingerprints for the stored virtual machines and store the fingerprints thus generated in fingerprint data on one or more of storage devices 150. Calculating fingerprints for a virtual machine involves dividing the virtual machine image and any data related to the virtual machine into chunks, and calculating a fingerprint for each chunk. A chunk is a fixed or variable length portion of data. Fingerprint module 162 can utilize various functions to generate a signature, or fingerprint for each chunk. Such functions can include one or more of, for example, a Secure Hash Algorithm (SHA), Message-Digest Algorithm 5 (MD5), a Rabin hash, a Cyclic Redundancy Check (CRC) and/or the like. For instance, a signature may be a hash that is generated by a hash function, such as SHA-1, that processes a particular chunk and in response computes the hash (e.g., a SIS-level signature).

In such a scenario, provisioning module 121 receives information from storage devices 150 regarding what fingerprints are stored in the resulting fingerprint data. One or more of storage devices 150 can transmit information regarding fingerprints to provisioning module 121 periodically, in response to the addition of new fingerprints (e.g., if a new virtual machine is stored in one of storage devices 150), and/or in response to a request by provisioning module 121. Such a request can specify one or more virtual machines for which fingerprint data should be transmitted to provisioning module 121.

In an environment such as computing environment 100, methods and systems such as those described herein include, as noted, property graph creation module 125 and property graph analysis module 126, as well as the property graph data created/analyzed (e.g., property graph data 127), in support of orchestration functions provided by one or more of the management modules that make up management modules 120. As will be appreciated in light of the present disclosure, property graph creation module 125 provides functionality that facilitates the creation of property graph data such as property graph data 127, while property graph analysis module 126 provides functionality that facilitates the analysis of such property graph data, as well as generating information that is in a form that is amenable to use by one or more orchestration systems.

FIG. 1B is a block diagram providing further details of an example property graph, such as property graph 130. Although one example embodiment is provided for discussion purposes herein, alternative embodiments can implement different numbers of physical machines, different numbers of virtual machines per physical machine, and the same system can include one or more physical machines that each implement a different number of virtual machines than other physical machines within the same environment.

As shown, property graph 130 includes a source node 131, a consistency group 132, and disk 133. The arrows between these entities, and between other entities in FIG. 1B, indicate the general "in" direction of flow among these nodes, which will be discussed in more detail below. Property graph 130 also includes various nodes 134(1)-134(n). These nodes can be any type of computing device, such as the type computing devices described elsewhere herein. One important feature of the functionality described elsewhere herein is that these methods are agnostic to the specific entities, such as nodes 134, that are between the disk 133 and database 135. As such, the propagation rules described herein can be used on type of node 134. Finally, property graph 120 also shows a target node 136, which is where this example property graph concludes.

Figure 2:
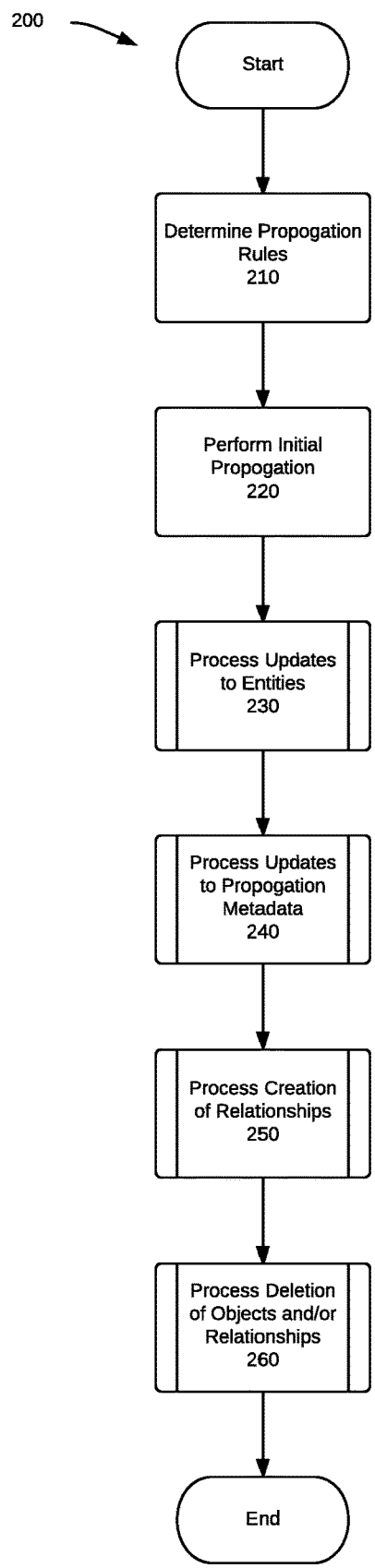
FIG. 2 is a flowchart depicting an overview of various actions that can be performed by the systems and methods described herein, according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIGS. 1A and 1B. In one embodiment, method 200 is performed by a management server, such as, e.g., management server 120. Moreover, the discussion of method 200 will be best understood when read in conjunction with FIG. 1B and property graph 130.

Method 200 provides an overview of operations that can be performed to effectuate various operations that are individual, but related, pieces of this disclosure. Although FIG. 200 depicts the various operations of method 200 as occurring in a linear fashion, such linear functionality is not necessarily required in practice. Rather, the individual steps are shown in this manner in order to facilitate a logical discussion herein, but not because of any underlying requirement that the operations must necessarily be performed in this order.

Subject to the foregoing, method 200 generally begins at 210, where the system determines propagation rules. Propagation rules define various conditions or other variables that govern propagation of information throughout a system, such as those systems described herein. In one embodiment, these propagation rules can include at least the following five factors: (1) Start condition; (2) Direction of Propagation; (3) Skip condition; (4) Reverse condition; and (5) End condition. As will be described in more detail elsewhere herein, these factors can be used by a system to determine when and how to propagate new, modified, or deleted information throughout that system.

The "start condition" is a value or condition that can trigger the propagation. The start condition can take more than one parameter. For example, in one embodiment the start condition takes a string value and a Boolean value. In this embodiment, the string value is a "type" attribute, which can specify the type of information to which the rule applies. For example, some potential types are "backup_policy," "file," and "consistency group." (To be clear, the potential types listed herein are merely examples. Moreover, other naming conventions can be used, as can abbreviations, and so forth.) In one embodiment, the Boolean value can be a "replicated" attribute, which can be used to indicate whether a given node or other entity has been replicated. In other embodiments, other values are possible. Moreover, although certain examples are provided to facilitate discussion herein, the exact semantics and parameters of the start condition can change from implementation to implementation, without affecting the disclosure as a whole. The same is true for each of the conditions (e.g., factors) discussed herein, and is also true with respect to the conditions (e.g., factors) themselves, which can also be added, changed, removed, and so forth, in various implementations of this disclosure.

The "direction of the propagation" indicates the direction in which information is propagated throughout a system, such as system 100. While other possibilities exist, this factor generally takes a single parameter. In one embodiment, the parameter indicates whether the direction is "in" or "out," thereby indicating whether the information is to be propagated into the network or out of the network. When set to "in," information is propagated into the network, such that the information generally flows from source 110 to target 160, as shown in FIG. 1B. When set to "out," information is propagated out of the network, such that the information generally flows from target 160 to source 110, as shown in FIG. 1B. In other embodiments, other values (e.g., 1 and 0, among many other options) can be used to indicate the direction of the propagation. Moreover, although certain examples are provided to facilitate discussion herein, the exact semantics and parameters of this factor can change from implementation to implementation, without affecting the disclosure as a whole.

The "skip condition" indicates a condition that, if and when the condition is met, causes the propagation to skip over a given node. While other possibilities exist, this factor generally takes multiple parameters. For instance, in one embodiment, this condition takes parameters indicating a "type" and a Boolean value indicating whether a "hypervisor" is present or otherwise being used. In other embodiments, this condition can accept more than one "type" parameter. In certain embodiments, the condition only requires the "hypervisor" Boolean value when the "type" refers to a virtual machine. Other possible parameters and values, of course, are also possible. In any event, when the condition defined by the rule is met, the propagation skips over the relevant node. As was the case with the parameters above, although certain examples are provided to facilitate discussion herein, the exact semantics and parameters of this factor can change from implementation to implementation, without affecting the disclosure as a whole.

The "reverse condition" indicates a condition that, if and when the condition is met, causes the system to reverse the direction of the propagation. While other possibilities exist, this factor generally takes one parameter. In one embodiment, the parameter indicates a "type" of node at which the propagation terminates, such as a "cg," which is an abbreviation for a "consistency group," or a "backup_policy." Other possible parameters and values, of course, are also possible. In any event, when the condition defined by the rule is met, the direction of the propagation is reversed at that point. As was the case with the parameters above, although certain examples are provided to facilitate discussion herein, the exact semantics and parameters of this factor can change from implementation to implementation, without affecting the disclosure as a whole.

The "end condition" indicates a condition that, if and when the condition is met, causes the propagation to terminate. While other possibilities exist, this factor generally takes a single parameter. In one embodiment, the parameter indicates a "type" of node at which the propagation terminates, such as an "application" or a "virtual machine." Other possible parameters and values, of course, are also possible. As was the case with the parameters above, although certain examples are provided to facilitate discussion herein, the exact semantics and parameters of this factor can change from implementation to implementation, without affecting the disclosure as a whole.

To provide a few examples, one potential propagation rule can be called "isApplicationReplicatedRule." For the sake of this example, the isApplicationReplicatedRule may have a start condition that requires a "type" parameter and a "replicated" Boolean parameter; a direction that takes a single parameter; a reverse condition that takes a single "type" parameter; a skip condition that takes a "type" parameter paired with a "hypervisor" Boolean parameter, along with a second "type" parameter that is not necessarily related to the first "type" parameter and "hypervisor" Boolean parameter; and an end condition that takes a single "type" parameter. This propagation rule may also contain an "end action."

Continuing with this example propagation rule, the rule may have the following values associated with the foregoing values: The start condition's "type" may indicate a "consistency group," and the "replicated" Boolean parameter may have a value of "true"; the direction may have a parameter with a value set to "in"; the reverse condition's "type" parameter may have a value that also indicates a "consistency group"; the skip condition's parameter pair ("type" parameter and "hypervisor" Boolean parameter) may have values set to "host" and "true," respectively, along with the second "type" parameter having a value that indicates "cluster"; the end condition's "type" parameter may have a value of "application"; and the end action may have a value such as "$entity.replicated=true." (As indicated above, these parameters and values are provided as examples only, and are not in any way intended to be limiting.)

Continuing with the example above, and referring where necessary to FIGS. 1A and 1B, the foregoing example propagation rule would start propagation of information from consistency group 120, assuming that the consistency group has been marked as replicated, as required by this example propagation rule. Any relevant information would then be propagated "in" to the network, that is, in the direction of disk 130, then to node 140(1), and so forth. The other conditions would be evaluated at, or with respect to, each subsequent node (or other entity, more generally), and the propagation would eventually stop when an "application" was reached. At that point, the end action can be performed.

Continuing with the discussion of FIG. 2 and method 200, the initial propagation of the propagation rules is performed at 220. In the first pass through this method, the propagation rules can themselves be propagated throughout the system as necessary. In other embodiments, such as when a management server is used, the management server maintains an efficient cache of the start conditions of the propagation rules, and can store all of the propagation rules in the efficient cache or in another memory structure. As such, since the rules do not always have to be propagated throughout the system, step 220 does not necessarily have to be performed (and often will not be performed). However, in such embodiments, the rules are stored in the appropriate location, in one manner or another, such that they are available for later access and use as needed. After their initial storage or propagation, the propagation rules can be added, modified, deleted, or otherwise changed on the fly as a service interface. Any modification and deletion can invalidate existing rule(s). Such functionality will be discussed in more detail below.

At step 230, method 200 processes updates to entities. This functionality is discussed in significantly more detail below, in the discussion of FIG. 3 and method 300, and therefore will not be repeated here. At step 240, method 200 processes updates to propagation metadata. This functionality is discussed in significantly more detail below, in the discussion of FIG. 4 and method 400, and therefore will not be repeated here. At step 250, method 200 processes the creation of new relationships. This functionality is discussed in significantly more detail below, in the discussion of FIG. 5 and method 500, and therefore will not be repeated here. At step 260, method 200 processes the deletion of objects and/or relationships. This functionality is discussed in significantly more detail below, in the discussion of FIG. 6 and method 600, and therefore will not be repeated here.

As noted above, method 200 provides an overview of operations that can be performed to effectuate various operations that are individual, but related, pieces of this disclosure. Although FIG. 200 depicts the various operations of method 200 as occurring in a linear fashion, such linear functionality is not necessarily required in practice. Rather, the individual steps are shown in this manner in order to facilitate a logical discussion herein, but not because of any underlying requirement that the operations must necessarily be performed in this order. This is especially true for 230, 240, 250, and 260, which are distinct methods that are largely independent of each other. Each of these methods will be discussed in more detail below.

Figure 3:
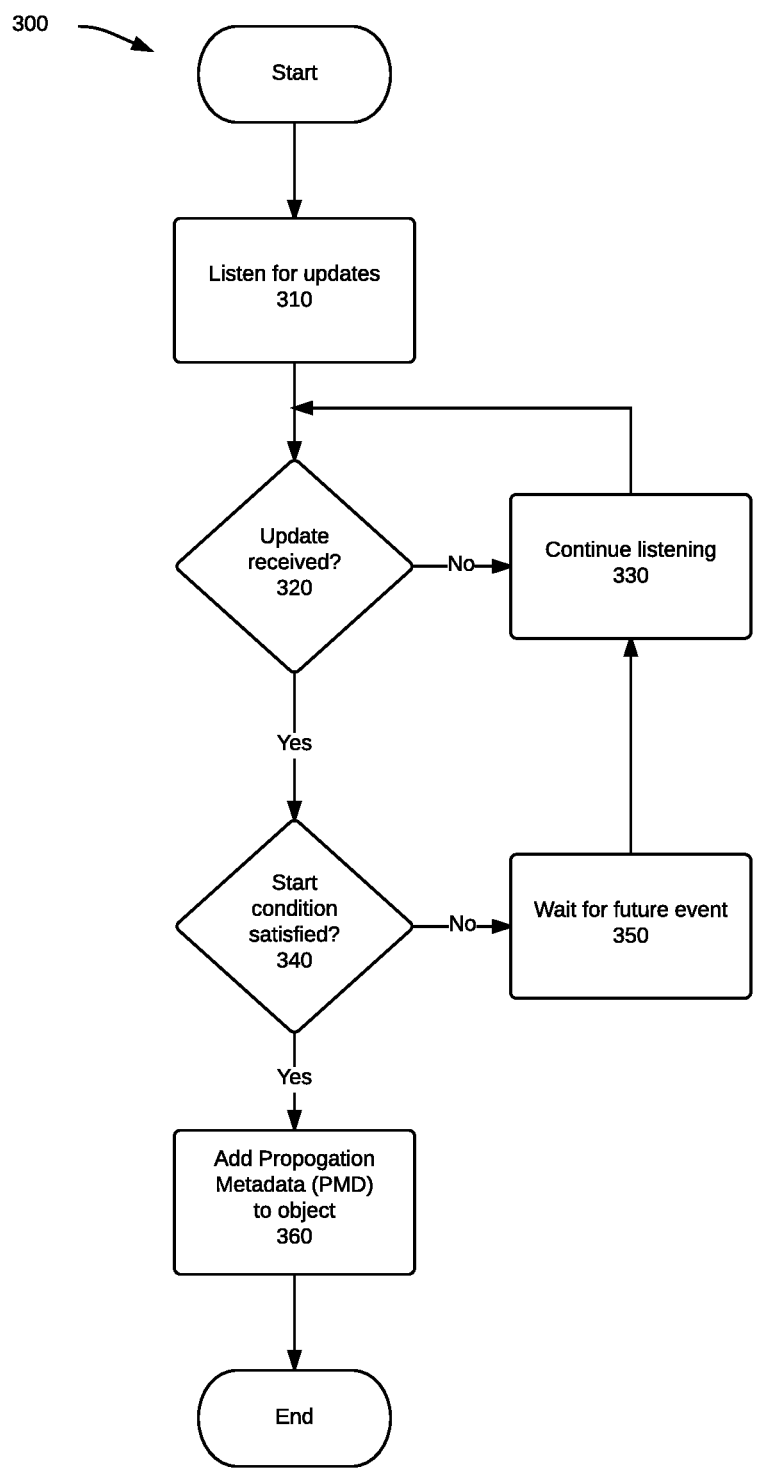
FIG. 3 is a flowchart depicting various actions that can be performed upon receiving or detecting an update to one or more entities, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1A, 1B, and 2. In one embodiment, method 300 is performed by a management server, such as, e.g., management server 120. In other embodiments, method 300 is performed by one or more threads, daemons, processes, or other such constructs (collectively, "threads") that are distinct from management server 120, such as can be localized on various of the other individual elements shown in FIGS. 1A and 1B. Moreover, the discussion of method 300 will be best understood when read in conjunction with FIG. 1B and property graph 130.

Prior to beginning method 300, at least step 210 will have been performed in typical embodiments, and the propagation rules will have been stored in at least one location in the system or network. As such, the management server (or some other system competent) generally has a baseline version of the rules prior to beginning method 300. The system also generally has a baseline version of a property graph, such as, e.g., property graph 130, prior to beginning method 300.

Method 300 begins at step 310, where the method listens for updates and/or additions (collectively, "update(s)") to entities. Method 300 determines at 320 whether such an update has been received. If method 300 determines at 320 determines that an update has not yet been received, then method 300 proceeds to 330 and continues listening for an update. If method 300 determines at 320 that an update has been received, method 300 proceeds to 340.

At 340, method 300 evaluates the update to determine if the start condition of one or more propagation rules has been met. If the start condition for a given propagation rule has not been met with respect to any given object, then method 300 proceeds to 350, where it waits for a future event. In the embodiment shown, waiting for a future event includes continuing to listen for updates, as shown in 350. In another embodiment, which is not expressly shown in FIG. 3, waiting for a future event can include returning directly to 350 if any such event occurs. In certain embodiments, method 300 can also terminate at this point, or move on to evaluating a different propagation rule with respect to the object. If the start condition for a given propagation rule is met with respect to any given object, then method 300 adds propagation metadata (PMD) on that object in 360. In various embodiments, propagation metadata contains at least the following information: An identification of the rule that has caused or resulted in the propagation, an identification of the start entity, and an identification list of any sibling that has caused or resulted in the propagation. As some examples, such propagation metadata can be used to mark an application within a virtual machine as being "at risk" when a backup policy for a virtual machine is disabled, or to mark a business application with a given classification type based on the classification of any storage medium in the context of the business application. Propagation rules can also be used to propagate various forms of information throughout a datacenter (or other system) in real time in a manner that is both automatic (with respect to not having the need for human interaction to cause or control the propagation) and agnostic (with respect to the underlying types of entities and other infrastructure components).

Figure 4:
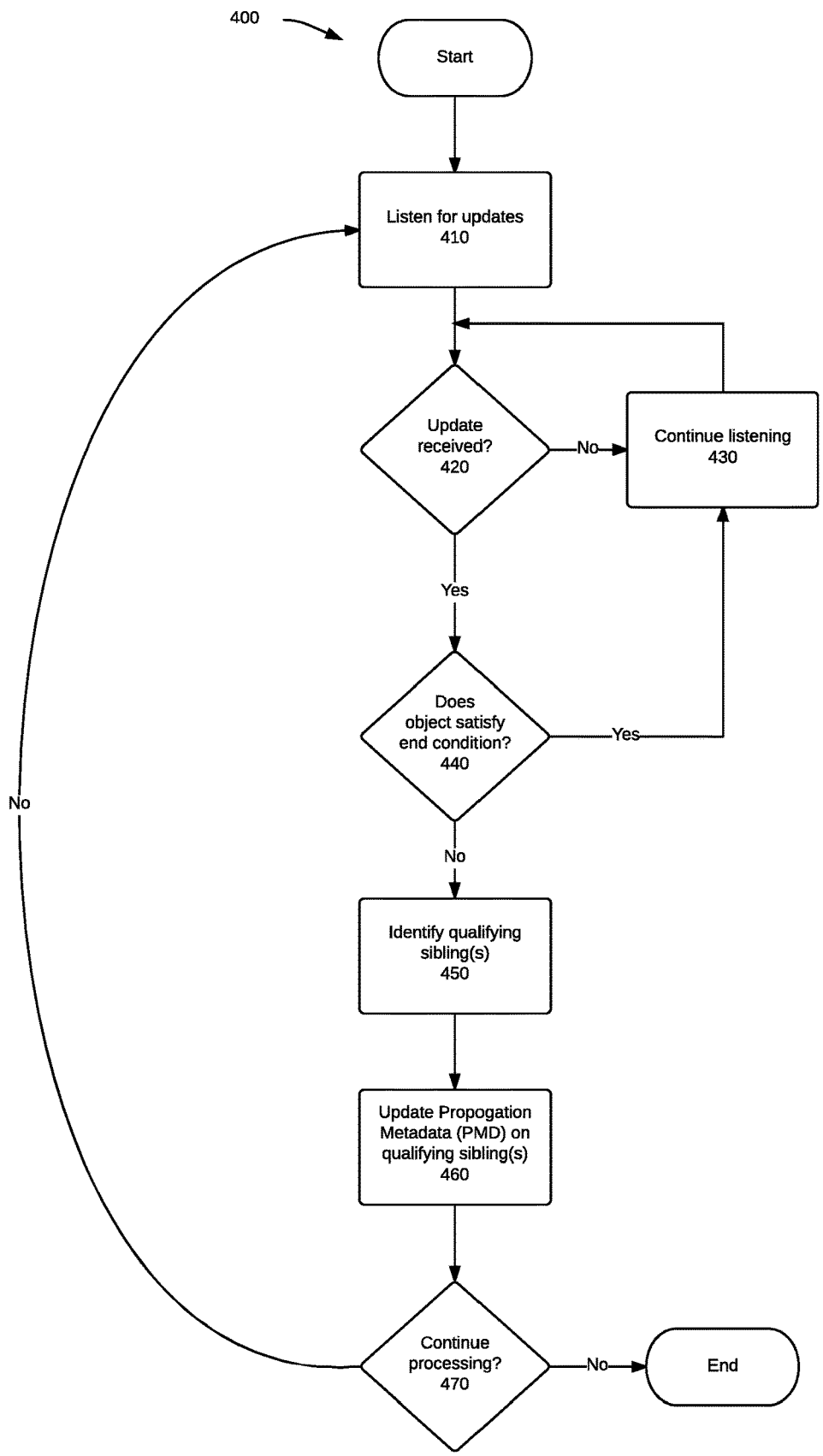
FIG. 4 is a flowchart depicting various actions that can be performed upon receiving or detecting updates and/or additions to propagation metadata on objects, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1A, 1B, and 2. In one embodiment, method 400 is performed by a management server, such as, e.g., management server 120. In other embodiments, method 400 is performed by one or more threads, daemons, processes, or other such constructs (collectively, "threads") that are distinct from management server 120, such as can be localized on various of the other individual elements shown in FIGS. 1A and 1B. Moreover, the discussion of method 400 will be best understood when read in conjunction with FIG. 1B and property graph 130.

Method 400 begins at 410, where the method listens for updates and/or additions (collectively, "update(s)") to propagation metadata ("PMD") on objects. For the sake of providing an example illustration of this method in action, consider the steps of this method from the perspective of node 134(1). Method 400 determines at 420 whether such an update has been received, such as, e.g., at node 134(1). If method 400 determines at 420 determines that an update has not yet been received at the given node being evaluated, then method 400 proceeds to 430 and continues listening for an update. If method 400 determines at 420 that an update has been received at the given node being evaluated, method 400 proceeds to 440.

At 440, method 400 evaluates the update to determine if the object satisfies the end condition of one or more propagation rules. If the end condition for a given propagation rule has not been met with respect to any given object, then method 400 proceeds to 430 and continues listening for an update. In certain embodiments, method 400 can also terminate at this point, or move on to evaluating a different propagation rule with respect to the object. If the end condition for a given propagation rule is met with respect to any given object, then method 400 identifies any qualifying sibling nodes in 450. For the sake of this example, let us assume that node 134(1) is not an application. As such, for the sake of the illustration being provided herein, from the perspective of node 134(1), then end condition is not met at this time, and method 400 proceeds to 450 and identifies any qualifying siblings of node 134(1).

As the term "sibling" is used herein, "sibling" is intended to mean a node that is directly connected to any given node. For instance, using the example propagation graph shown in FIG. 1B, disk 133, node 134(2), and node 134(3) are siblings of node 134(1); node 134(1) and node 134(4) are siblings of node 134(2); node 134(1) and node 134(4) are siblings of node 134(3); node 134(2), node 134(3), and node 134(n) are siblings of node 134(4), and so forth. The other entities in a given property graph can also have entities. For instance, and again using the example propagation graph shown in FIG. 1B, consistency group 132 and node 134(1) are siblings of disk 133, and so forth through property graph 130.

Qualifying siblings are determined by evaluating the siblings of any given node with respect to two conditions: First, the siblings are evaluated with respect to the "direction of propagation" criteria of the rule. Second, the siblings are evaluated with respect to the criteria of the skip condition, which could result in one or more qualifying siblings being skipped. So using the example rule that was provided above, and considering the application of that rule from the perspective of node 134(1), we have already indicated that disk 133, node 134(2), and node 134(3) are all siblings of node 134(1). However, only node 134(2) and node 134(3) satisfy the "direction of propagation" condition when the direction is set to "in." Thus, node 134(2) and node 134(3) are the only potential qualifying siblings of node 134(1), and both of those nodes would be identified as qualifying siblings as long as each of those nodes is not excluded by the skip condition. For the sake of this example, however, let us assume that node 134(2) satisfies the criteria of the skip condition, but that node 134(1) does not meet the criteria of the skip condition. In that scenario, node 134(2) would not be a qualifying sibling, thereby leaving node 134(3) as the only qualifying sibling of node 134(1).

After method 400 identifies the qualifying sibling(s) of a given node in 450, method 400 proceeds to 460. At 460, method 400 updates the propagation metadata ("PMD") on the identified qualifying siblings. Thus, continuing with the example provided above, method 400 would update the PMD on node 134(3). At this point, method 400 determines at 470 whether to continue processing, e.g., whether to continue listening for further updates. If method 400 determines not to continue processing, then method 400 would end at this point. However, in the usual situation where method 400 determines at 470 to continue processing, method 400 would return to 410. Continuing with the specific example given above, node 134(3) is updated in accordance with 460, which triggers another iteration through method 400, this time from the perspective of node 134(3).

Figure 5:
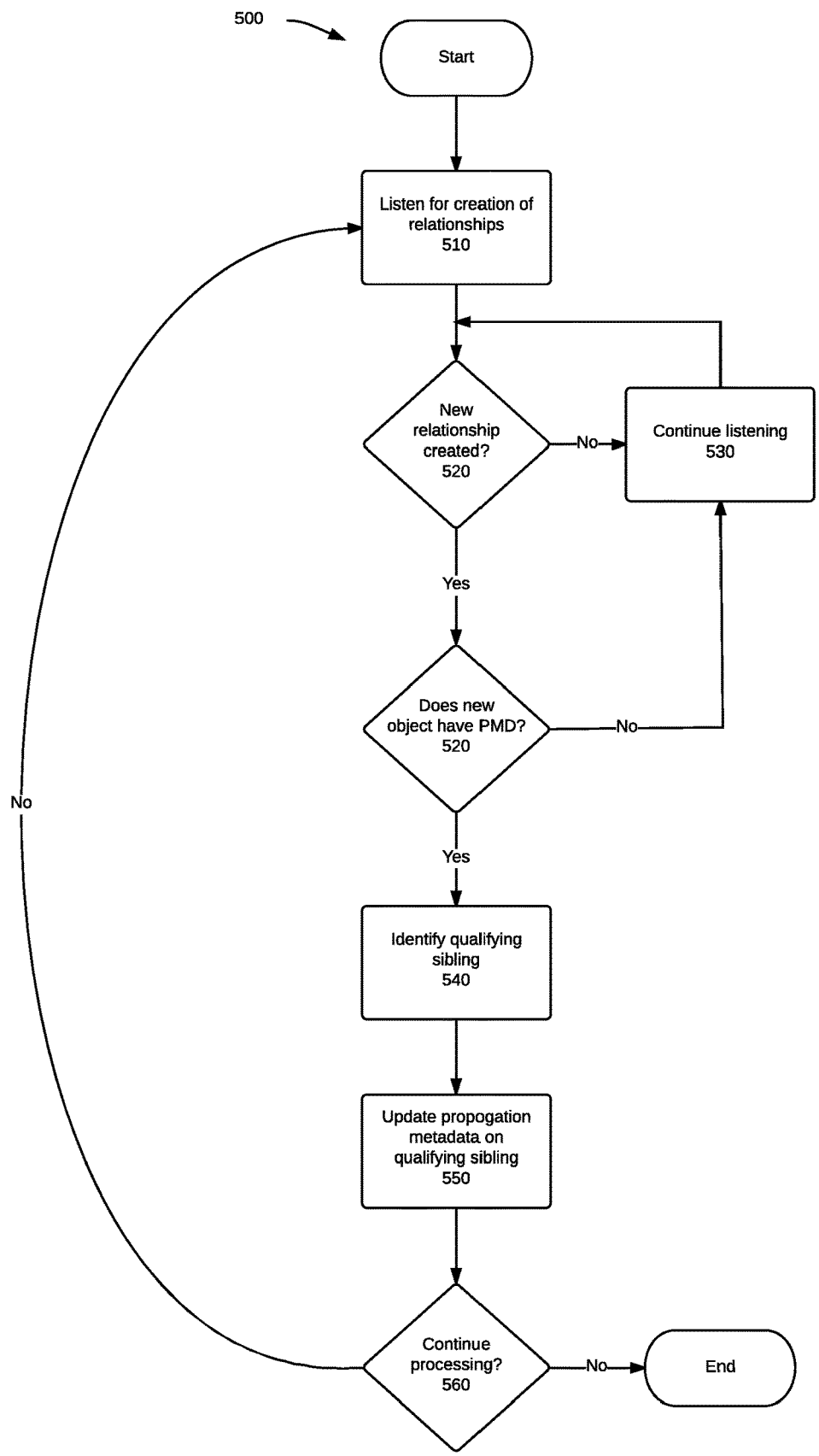
FIG. 5 is a flowchart depicting various actions that can be performed upon the creation of one or more nodes, objects, or relationships, according to one embodiment of this disclosure.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIGS. 1A, 1B, and 2. In one embodiment, method 500 is performed by a management server, such as, e.g., management server 120. In other embodiments, method 500 is performed by one or more threads, daemons, processes, or other such constructs (collectively, "threads") that are distinct from management server 120, such as can be localized on various of the other individual elements shown in FIGS. 1A and 1B. Moreover, the discussion of method 500 will be best understood when read in conjunction with FIG. 1B and property graph 130.

Method 500 begins at 510, where the method listens for the creation of new relationships between nodes (or other entities). Method 500 determines at 520 whether a new relationship has been created in the network represented by the property graph. If method 500 determines at 520 determines that a new relationship has not been created in the network represented by the property graph, then method 500 proceeds to 530 and continues listening for the creation of a new relationship. If method 500 determines at 520 that a new relationship has been recently created, then method 500 proceeds to 540. For the sake of illustrating method 500, let us assume that node 134(3) was not previously part of property graph 130, but instead was newly added (albeit in its current position in property graph 130). In this example, method 500 would determine at 520 that two new relationships have been added, namely, (1) the relationship between node 134(3) and node 134(1), and (2) the relationship between node 134(3) and node 134(4). As such, method 500 would proceed to 540 in this example.

At 540, method 500 determines if the new object has any propagation metadata, or "PMD." If method 500 determines at 540 determines that the new object does not have any PMD, then method 500 proceeds to 530 and continues listening for the creation of a new relationship. If method 500 determines at 540 that the new object does have PMD, then method 500 proceeds to 550.

At 550, method 500 identifies any qualifying sibling nodes. Continuing with the example based on the creation of node 134(3), and the definitions provided above, then method 500 identifies any qualifying siblings of node 134(3) at this point. As was the case with method 400, qualifying siblings are determined by evaluating the siblings of any given node with respect to two conditions: First, the siblings are evaluated with respect to the "direction of propagation" criteria of the rule. Second, the siblings are evaluated with respect to the criteria of the skip condition, which could result in one or more qualifying siblings being skipped. So using the example rule that was provided above, and considering the application of that rule from the perspective of node 134(3), we have already indicated that node 134(1) and node 134(4) are siblings of node 134(3). However, only node 134(4) satisfies the "direction of propagation" condition when the direction is set to "in." Thus, node 134(4) is the only potential qualifying sibling of node 134(3), which again is a newly added node in this example. As a result, node 134(4) would be identified as a qualifying sibling as long as node 134(4) is not excluded by the skip condition. For the sake of this example, however, let us assume that node 134(4) does not satisfy the criteria of the skip condition. In that scenario, node 134(4) would be identified as a qualifying sibling of node 134(3), which again, for the sake of this example illustration, we are treating as having been newly added to the network and/or property graph.

After method 500 identifies the qualifying sibling(s) of a given node at 550, method 500 proceeds to 560. At 560, method 500 updates the propagation metadata ("PMD") on the identified qualifying siblings. Thus, continuing with the example provided above, method 500 would update the PMD on node 134(4). At this point, method 500 determines at 570 whether to continue processing, e.g., whether any further processing is needed. If method 500 determines not to continue processing at this time, then method 500 would end at this point. However, in the usual situation where method 500 determines at 570 to continue processing, method 500 would return to 510. Moreover, although not shown expressly on FIG. 4 or FIG. 5, when PMD is updated on a qualifying sibling in step 560, that update then generally triggers another pass through FIG. 4 and method 400 with respect to the newly updated node (in this example, node 134(4)), to determine if that updated information should also be propagated to any other qualifying siblings of node 134(4).

Figure 6:
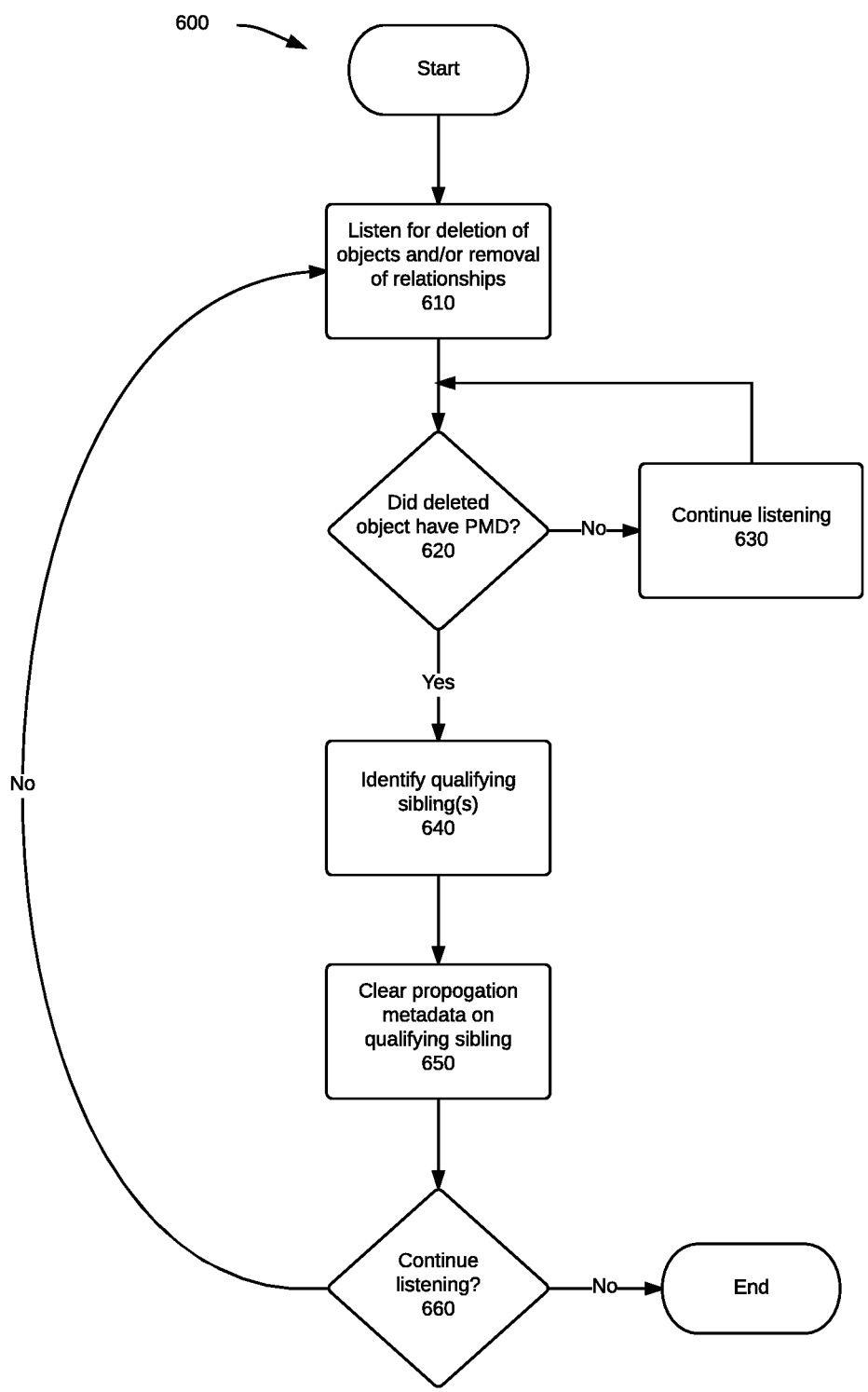
FIG. 6 is a flowchart depicting various actions that can be performed upon the deletion or removal of one or more nodes, objects, or relationships, according to one embodiment of this disclosure.

FIG. 6 is a flowchart of a method 600 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 600 is described with reference to elements such as those described in connection with FIGS. 1A, 1B, and 2. In one embodiment, method 600 is performed by a management server, such as, e.g., management server 120. In other embodiments, method 600 is performed by one or more threads, daemons, processes, or other such constructs (collectively, "threads") that are distinct from management server 120, such as can be localized on various of the other individual elements shown in FIGS. 1A and 1B. Moreover, the discussion of method 600 will be best understood when read in conjunction with FIG. 1B and property graph 130.

Method 600 begins at 610, where the method listens for the deletion or removal (collectively, "deletion" and conjugates thereof) of objects and/or relationships (collectively, "object(s)"). Method 600 determines at 620 whether the deleted object had any propagation metadata, or "PMD." If method 600 determines at 620 determines that the deleted object did not have any PMD, then method 600 proceeds to 630 and continues listening for the deletion of another object. If method 600 determines at 620 that the deleted object did have PMD, then method 600 proceeds to 640. For the sake of illustrating method 600, let us assume that node 134(3) was deleted. Let us further assume that node 134(3) did contain PMD. In this example, method 600 would determine at 620 that node 134(3) had PMD, and as such, method 600 would proceed to 640 in this example.

At 640, method 600 identifies any qualifying sibling nodes. Continuing with the example based on the deletion of node 134(3), and the definitions provided above, method 600 then identifies any qualifying siblings of node 134(3) at this point. As was the case with methods 400 and 500, qualifying siblings are determined by evaluating the siblings of any given node with respect to two conditions: First, the siblings are evaluated with respect to the "direction of propagation" criteria of the rule. Second, the siblings are evaluated with respect to the criteria of the skip condition, which could result in one or more qualifying siblings being skipped. So using the example rule that was provided above, and considering the application of that rule from the perspective of node 134(3), we have already indicated that node 134(1) and node 134(4) are siblings of node 134(3). However, only node 134(4) satisfies the "direction of propagation" condition when the direction is set to "in." Thus, node 134(4) is the only potential qualifying sibling of node 134(3), which again is a newly added node in this example. As a result, node 134(4) would be identified as a qualifying sibling as long as node 134(4) is not excluded by the skip condition. For the sake of this example, however, let us assume that node 134(4) does not satisfy the criteria of the skip condition. In that scenario, node 134(4) would be identified as a qualifying sibling of node 134(3), which again, for the sake of this example illustration, we are treating as having been recently deleted from the network and/or property graph.

After method 600 identifies the qualifying sibling(s) of a given node at 640, method 600 proceeds to 650. At 650, method 600 clears the propagation metadata ("PMD") on the identified qualifying siblings. Thus, continuing with the example provided above, method 600 would clear the PMD on node 134(4). At this point, method 600 determines at 660 whether to continue processing, e.g., whether any further processing is needed. If method 600 determines not to continue processing at this time, then method 600 would end at this point. However, in the usual situation where method 600 determines at 660 to continue processing, method 600 would return to 610.

Figure 7:
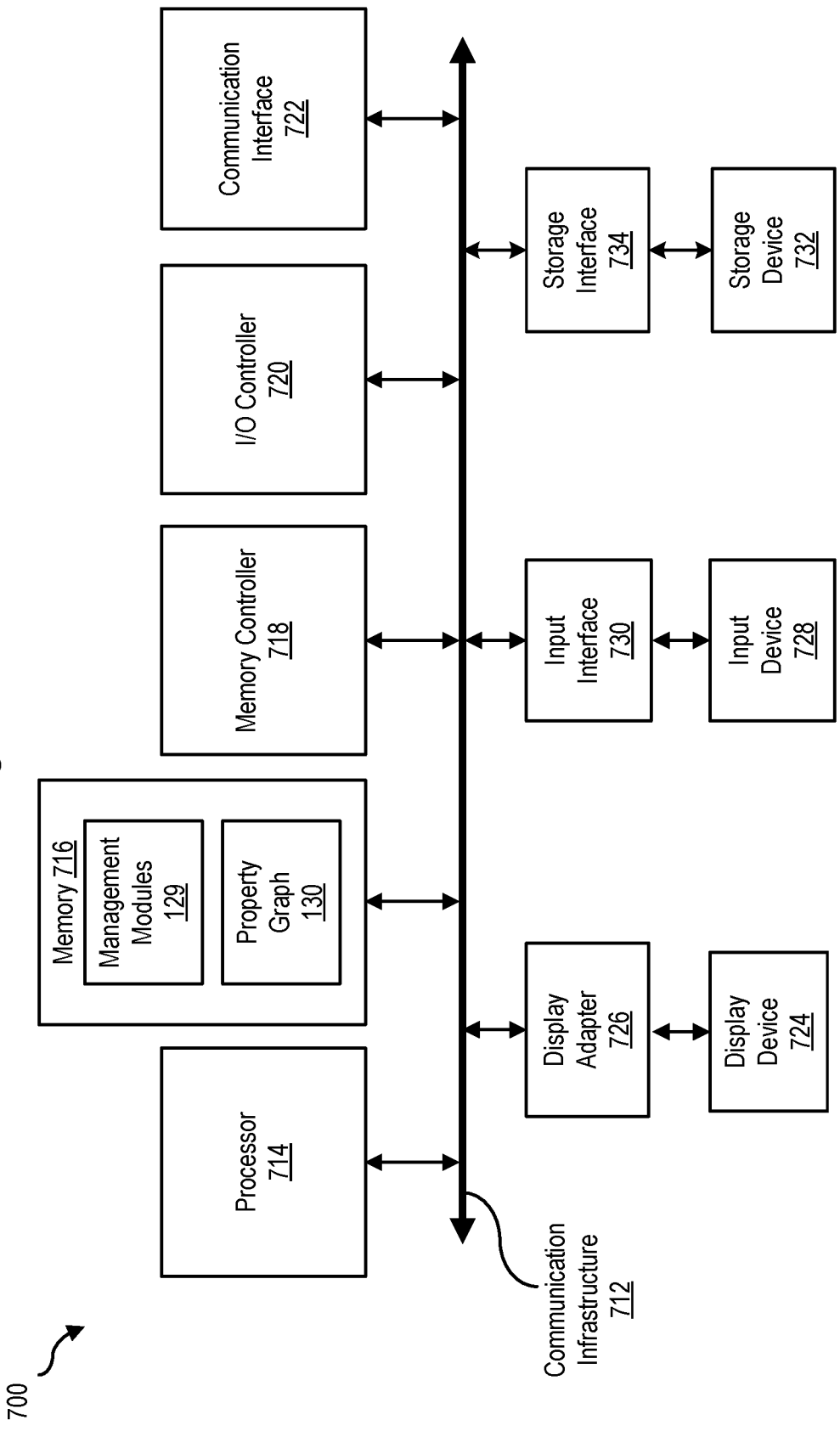
FIG. 7 is a block diagram of a computing device, illustrating how certain features of the instant disclosure can be implemented, according to one embodiment of the present disclosure.

FIG. 7 is a block diagram of a computing system 700 capable of performing one or more of the operations described above. Computing system 700 broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 714 and a memory 716. By executing software that invokes one or more of management modules 129 or property graph 130, or any modifications thereof consistent with this disclosure, computing system 700 becomes a special purpose computing device that is configured to perform operations in the manner described above.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. For example, processor 714 may perform and/or be a means for performing the operations described herein. Processor 714 may also perform and/or be a means for performing any other operations, methods, or processes described and/or illustrated herein.

Memory 716 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 700 may include both a volatile memory unit and a non-volatile storage device. In one example, program instructions implementing on or more operations described herein may be loaded into memory 710.

In certain embodiments, computing system 700 may also include one or more components or elements in addition to processor 714 and memory 716. For example, as illustrated in FIG. 7, computing system 700 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 700. For example, in certain embodiments memory controller 718 may control communication between processor 714, memory 716, and I/O controller 720 via communication infrastructure 712. In certain embodiments, memory controller 718 may perform and/or be a means for performing, either alone or in combination with other elements, one or more of the operations or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 700, such as processor 714, memory 716, communication interface 722, display adapter 726, input interface 730, and storage interface 734.

Communication interface 722 broadly represents any type or form of communication device or adapter capable of facilitating communication between computing system 700 and one or more additional devices. For example, in certain embodiments communication interface 722 may facilitate communication between computing system 700 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 722 may also allow computing system 700 to engage in distributed or remote computing. For example, communication interface 722 may receive instructions from a remote device or send instructions to a remote device for execution.

As illustrated in FIG. 7, computing system 700 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724.

As illustrated in FIG. 7, computing system 700 may also include at least one input device 728 coupled to communication infrastructure 712 via an input interface 730. Input device 728 generally represents any type or form of input device capable of providing input, either computer or human generated, to computing system 700. Examples of input device 728 include, without limitation, a keyboard, a pointing device, a speech recognition device, or any other input device.

As illustrated in FIG. 7, computing system 700 may also include a storage device 732 coupled to communication infrastructure 712 via a storage interface 734. Storage device 732 generally represents any type or form of storage device or medium capable of storing data and/or other computer-readable instructions. For example, storage device 732 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage device 732 and other components of computing system 700. A storage device like storage device 732 can store information such as the data structures described herein, as well as one or more computer-readable programming instructions that are capable of causing a computer system to execute one or more of the operations described herein.

In certain embodiments, storage device 732 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 732 may also include other similar structures or devices for allowing computer software, data, or other computer-readable instructions to be loaded into computing system 700. For example, storage device 732 may be configured to read and write software, data, or other computer-readable information. Storage devices 732 may also be a part of computing system 500 or may be a separate device accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7.

Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The non-transient computer-readable storage medium containing the computer programming instructions may be loaded into computing system 700. All or a portion of the computer programming instructions stored on the non-transient computer-readable storage medium may then be stored in memory 716 and/or various portions of storage device 732. When executed by processor 714, a computer program loaded into computing system 700 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments disclosed herein.

Figure 8:
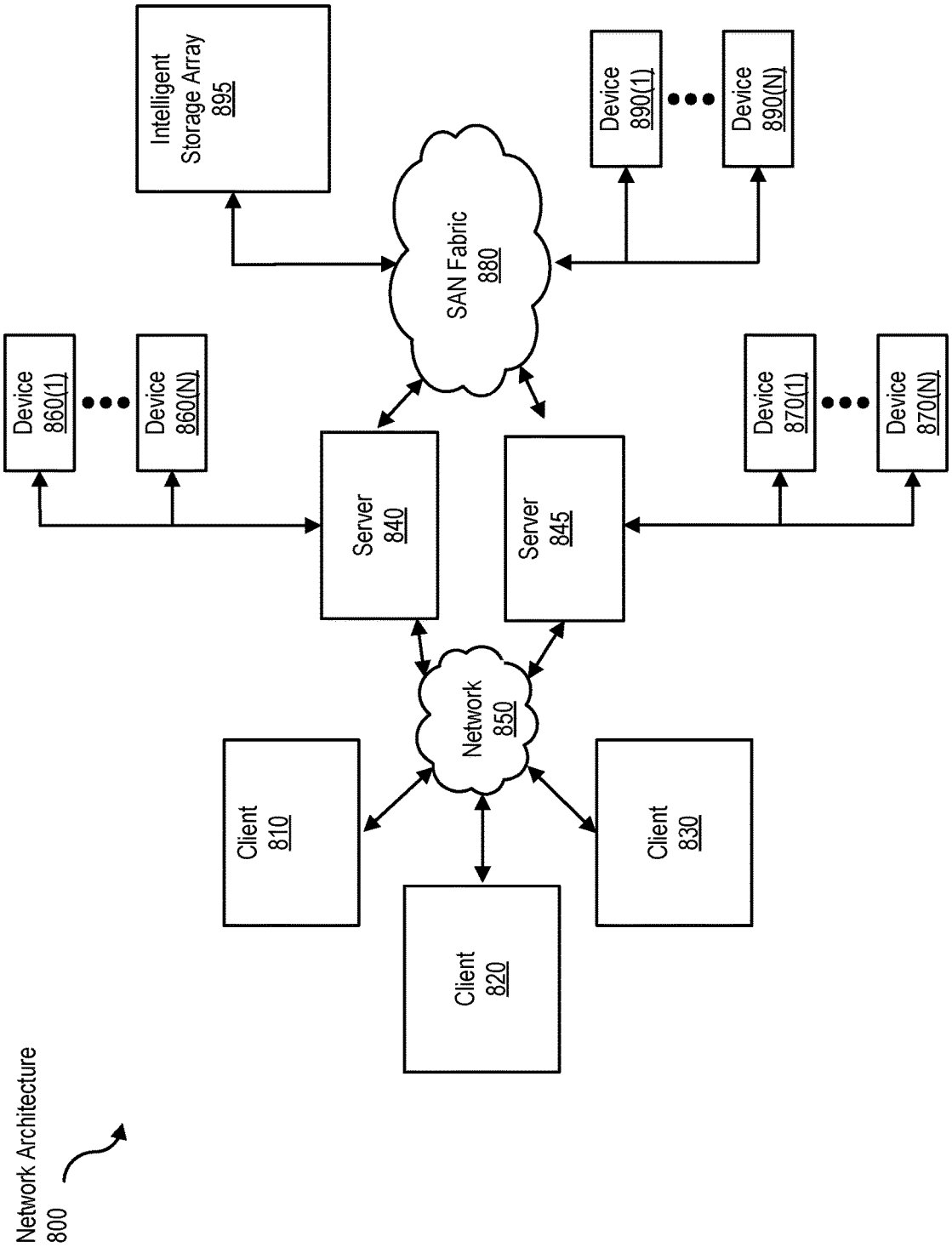
FIG. 8 is a block diagram of a networked system, illustrating how various computing devices can communicate via a network, according to one embodiment of the present disclosure.

FIG. 8 is a block diagram of a network architecture 800 in which client systems 810, 820, and 830, and servers 840 and 845 may be coupled to a network 850. Client systems 810, 820, and 830 generally represent any type or form of computing device or system, such as computing system 700 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, one or more of client systems 810, 820, and/or 830 may include software configured to execute one or more of management modules 129 and/or property graph 130, and/or one or more components or threads thereof.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS). Such storage devices can store backup information and storage configuration information, as described above.

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 700 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 840(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of one of the systems in FIGS. 1A, 1B, 7, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
monitoring a datacenter for a change to the datacenter, wherein
the monitoring is performed by a management server,
the datacenter comprises a plurality of entities in communication with one another via a network,
the plurality of entities comprise at least a first entity and a second entity,
the change to the datacenter is caused by one or more operations being performed,
each entity of the plurality of entities is at least one of a hardware device, a software component, or group of hardware devices and/or software components, and is represented by a corresponding node of a plurality of nodes of a property graph,
the property graph is a directed graph,
the property graph represents one or more relationships between ones of the plurality of entities as one or more edges of a plurality of edges between the ones of the plurality of nodes,
each of the one or more edges represents a corresponding dependency, of a plurality of dependencies, between the ones of the plurality of entities,
each node of the plurality of nodes is represented by a corresponding object instance of a plurality of object instances,
the first entity is represented by a first node of the plurality of nodes,
the first node is represented by a first object instance of the plurality of object instances,
the second entity is represented by a second node of the plurality of nodes,
the second node is represented by a second object instance of the plurality of object instances, and
a dependency, of the plurality of dependencies, between the first entity and the second entity is represented by an edge, of the plurality of edges, between the first node and the second node;
detecting the change to the datacenter, wherein
the detecting is performed by a property graph analysis module of the management server,
the property graph analysis module detects the change by analyzing property graph data representing the property graph,
the property graph data comprises the plurality of object instances, and
information is associated with the change to the datacenter;
in response to detecting the change to the datacenter,
determining a first propagation rule of the first object instance, wherein the first propagation rule comprises at least a first condition; and
automatically propagating the information from the first object instance to the second object instance, wherein
the automatically propagating the information comprises
evaluating at least a portion of the information with regard to the first condition with respect to propagating the information to the second object instance, and
in response to the at least the portion of the information meeting the first condition, propagating the information to the second object instance.

2. The method of claim 1, wherein
the one or more operations comprise at least one of
an addition operation that adds another entity to the datacenter,
a removal operation that removes an entity of the plurality of entities from the datacenter, or
a migration operation that migrates the entity of the plurality of entities within the datacenter.

3. The method of claim 2, wherein
the one or more operations further comprise an update operation that updates propagation metadata of a first object instance representing the first node.

4. The method of claim 2, wherein
the one or more operations further comprise a creation of a new relationship between the ones of the plurality of entities.

5. The method of claim 2, wherein
the one or more operations further comprise a deletion of an existing relationship between the ones of the plurality of entities.

6. The method of claim 2, further comprising:
determining a qualifying sibling node of the plurality of nodes.

7. The method of claim 2, further comprising:
adding propagation metadata to a first object instance representing the first node.

8. The method of claim 3, further comprising:
determining a qualifying sibling node of the plurality of nodes; and
updating the propagation metadata of an object instance representing the qualifying sibling node.

9. The method of claim 5, further comprising:
determining a qualifying sibling node of the plurality of nodes; and
clearing propagation metadata from an object instance representing the qualifying sibling node.

10. A computer system comprising:
one or more processors; and
a non-transient computer-readable storage medium, comprising computer instructions executable by the one or more processors, wherein the computer instructions are configured to perform a method comprising
monitoring a datacenter for a change to the datacenter, wherein
the monitoring is performed by a management server,
the datacenter comprises a plurality of entities in communication with one another via a network,
the plurality of entities comprise at least a first entity and a second entity,
the change to the datacenter is caused by one or more operations being performed,
each entity of the plurality of entities is at least one of a hardware device, a software component, or group of hardware devices and/or software components, and is represented by a corresponding node of a plurality of nodes of a property graph, the property graph is a directed graph,
the property graph represents one or more relationships between ones of the plurality of entities as one or more edges of a plurality of edges between the ones of the plurality of nodes,
each of the one or more edges represents a corresponding dependency, of a plurality of dependencies, between the ones of the plurality of entities,
each node of the plurality of nodes is represented by a corresponding object instance of a plurality of object instances,
the first entity is represented by a first node of the plurality of nodes,
the first node is represented by a first object instance of the plurality of object instances,
the second entity is represented by a second node of the plurality of nodes,
the second node is represented by a second object instance of the plurality of object instances, and
a dependency, of the plurality of dependencies, between the first entity and the second entity is represented by an edge, of the plurality of edges, between the first node and the second node,
detecting the change to the datacenter, wherein
the detecting is performed by a property graph analysis module of the management server,
the property graph analysis module detects the change by analyzing property graph data representing the property graph,
the property graph data comprises the plurality of object instances, and
information is associated with the change to the datacenter,
in response to detecting the change to the datacenter,
determining a first propagation rule of the first object instance, wherein the first propagation rule comprises at least a first condition, and
automatically propagating the information from the first object instance to the second object instance, wherein
the automatically propagating the information comprises evaluating at least a portion of the information with regard to the first condition with respect to propagating the information to the second object instance, and
in response to the at least the portion of the information meeting the first condition, propagating the information to the second object instance.

11. The computer system of claim 10, wherein
the one or more operations comprise at least one of
an addition operation that adds another entity to the datacenter,
a removal operation that removes an entity of the plurality of entities from the datacenter, or
a migration operation that migrates the entity of the plurality of entities within the datacenter.

12. The computer system of claim 11, wherein
the one or more operations further comprise an update operation that updates propagation metadata of a first object instance representing the first node.

13. The computer system of claim 11, wherein
the one or more operations further comprise a creation of a new relationship between the ones of the plurality of entities.

14. The computer system of claim 11, wherein
the one or more operations further comprise a deletion of an existing relationship between the ones of the plurality of entities.

15. The computer system of claim 11, wherein the method further comprises:
adding propagation metadata to a first object instance representing the first node.

16. The computer system of claim 15, wherein the method further comprises:
determining a qualifying sibling node of the plurality of nodes; and
updating the propagation metadata of an object instance representing the qualifying sibling node.

17. The computer system of claim 16, wherein the method further comprises:
determining a qualifying sibling node of the plurality of nodes; and
clearing propagation metadata from an object instance representing the qualifying sibling node.

18. A computer program product, comprising a plurality of instructions stored on a non-transitory computer-readable storage medium, wherein the instructions are configured to execute a method comprising:
monitoring a datacenter for a change to the datacenter, wherein
the monitoring is performed by a management server,
the datacenter comprises a plurality of entities in communication with one another via a network,
the plurality of entities comprise at least a first entity and a second entity,
the change to the datacenter is caused by one or more operations being performed,
each entity of the plurality of entities is at least one of a hardware device, a software component, or group of hardware devices and/or software components, and is represented by a corresponding node of a plurality of nodes of a property graph,
the property graph is a directed graph,
the property graph represents one or more relationships between ones of the plurality of entities as one or more edges of a plurality of edges between the ones of the plurality of nodes,
each of the one or more edges represents a corresponding dependency, of a plurality of dependencies, between the ones of the plurality of entities,
each node of the plurality of nodes is represented by a corresponding object instance of a plurality of object instances,
the first entity is represented by a first node of the plurality of nodes,
the first node is represented by a first object instance of the plurality of object instances,
the second entity is represented by a second node of the plurality of nodes,
the second node is represented by a second object instance of the plurality of object instances, and
a dependency, of the plurality of dependencies, between the first entity and the second entity is represented by an edge, of the plurality of edges, between the first node and the second node;
detecting the change to the datacenter, wherein
the detecting is performed by a property graph analysis module of the management server,
the property graph analysis module detects the change by analyzing property graph data representing the property graph, the property graph data comprises the plurality of object instances, and information is associated with the change to the datacenter;

in response to detecting the change to the datacenter, determining a first propagation rule of the first object instance, wherein the first propagation rule comprises at least a first condition; and automatically propagating the information from the first object instance to the second object instance, wherein the automatically propagating the information comprises evaluating at least a portion of the information with regard to the first condition with respect to propagating the information to the second object instance, and in response to the at least the portion of the information meeting the first condition, propagating the information to the second object instance.

19. The computer program product of claim 18, wherein the method further comprises:

determining a qualifying sibling node of the plurality of nodes, wherein the determining the qualifying sibling node is performed in response to determining that at least one of the one or more operations is a creation operation that creates a new relationship between the ones of the plurality of entities; and updating propagation metadata of an object instance representing the qualifying sibling node.

20. The computer program product of claim 19, wherein the method further comprises:

determining a qualifying sibling node of the plurality of nodes, wherein the determining the qualifying sibling node is performed in response to determining that at least one of the one or more operations is a deletion operation that deletes an existing relationship between the ones of the plurality of entities; and clearing propagation metadata from an object instance representing the qualifying sibling node.

* * * * *